(12) United States Patent
Bandyopadhyay et al.

(10) Patent No.: US 9,723,062 B2
(45) Date of Patent: Aug. 1, 2017

(54) SYSTEM FOR DYNAMIC SERVICE COLLABORATION THROUGH IDENTIFICATION AND CONTEXT OF PLURALITY OF HETEROGENEOUS DEVICES

(75) Inventors: Soma Bandyopadhyay, West Bengal (IN); Souvik Maiti, West Bengal (IN); Munmun Sengupta, West Bengal (IN); Subhajit Dutta, West Bengal (IN)

(73) Assignee: Tata Consultancy Services Limited, Maharashtra (IN)

( * ) Notice: Subject to any disclaimer, the term of this patent is extended or adjusted under 35 U.S.C. 154(b) by 662 days.

(21) Appl. No.: 14/344,464

(22) PCT Filed: Sep. 4, 2012

(86) PCT No.: PCT/IN2012/000579
§ 371 (c)(1),
(2), (4) Date: Aug. 19, 2014

(87) PCT Pub. No.: WO2013/105104
PCT Pub. Date: Jul. 18, 2013

(65) Prior Publication Data
US 2014/0351334 A1 Nov. 27, 2014

(30) Foreign Application Priority Data
Sep. 12, 2011 (IN) .......................... 2560/MUM/2011

(51) Int. Cl.
*G06F 15/16* (2006.01)
*G06F 15/173* (2006.01)
(Continued)

(52) U.S. Cl.
CPC .............. *H04L 67/10* (2013.01); *H04L 67/12* (2013.01); *H04L 67/125* (2013.01); *H04L 67/16* (2013.01); *H04W 4/006* (2013.01)

(58) Field of Classification Search
CPC ... G06Q 10/10; H04L 29/06; H04L 29/08072; H04L 29/06027; H04L 15/581;
(Continued)

(56) References Cited

U.S. PATENT DOCUMENTS

| | | |
|---|---|---|
| 6,601,097 B1 | 7/2003 | Cheston et al. |
| 7,243,050 B2 | 7/2007 | Armstrong et al. |

(Continued)

FOREIGN PATENT DOCUMENTS

| | | |
|---|---|---|
| KR | 20080096614 A | 10/2008 |
| WO | WO2009076203 A1 | 6/2009 |

OTHER PUBLICATIONS

Joonyoung Jung et al "Wireless body area network in a ubiquitous healthcare system for physiological signal monitoring and health consulting."
(Continued)

*Primary Examiner* — Mahran Abu Roumi
(74) *Attorney, Agent, or Firm* — Hayes Soloway PC

(57) ABSTRACT

The present disclosure provides a system and method to provide a mechanism to perform faster collaboration among the services by retrieving the context information from the central device using service identifier as key element. The system is adapted to create a unique device identifier by associating device MAC address, context information and operation/service identifier while performing the device registration.

18 Claims, 2 Drawing Sheets

(51) Int. Cl.
*G09G 5/00* (2006.01)
*H04L 29/08* (2006.01)
*H04W 4/00* (2009.01)

(58) Field of Classification Search
CPC ..... H04L 41/0213; H04L 41/22; H04L 41/12; G06T 11/60; G06T 19/00; G06T 11/00; G06F 9/4443; G06F 3/0481
USPC ........................................................ 709/204
See application file for complete search history.

(56) References Cited

U.S. PATENT DOCUMENTS

| | | | |
|---|---|---|---|
| 7,620,737 | B2 | 11/2009 | Newman et al. |
| 7,730,208 | B2 | 6/2010 | Saha et al. |
| 7,818,017 | B2 | 10/2010 | Alizadeh-Shabdiz et al. |
| 7,847,699 | B2 | 12/2010 | Lee et al. |
| 7,937,434 | B2 | 5/2011 | Cho |
| 8,069,157 | B2 | 11/2011 | Jam et al. |
| 8,504,686 | B2 | 8/2013 | Phaal et al. |
| 2006/0217934 | A1* | 9/2006 | Armstrong ............ G08B 21/20 702/188 |
| 2007/0150817 | A1 | 6/2007 | Ducheneaut et al. |
| 2007/0210916 | A1* | 9/2007 | Ogushi ............ G06Q 10/0875 340/531 |
| 2008/0139217 | A1* | 6/2008 | Alizadeh-Shabdiz .... G01S 5/02 455/456.1 |
| 2008/0246734 | A1* | 10/2008 | Tsui ...................... H02J 7/0055 345/169 |
| 2011/0063098 | A1* | 3/2011 | Fischer ............ G07C 9/00119 340/439 |
| 2011/0199389 | A1* | 8/2011 | Lu ........................... G06F 3/017 345/619 |
| 2011/0258303 | A1* | 10/2011 | Nath ...................... G06F 9/468 709/223 |
| 2011/0298301 | A1* | 12/2011 | Wong .................. H04L 12/2827 307/116 |
| 2013/0061298 | A1* | 3/2013 | Longobardi ............ G06F 21/42 726/6 |
| 2014/0351334 | A1* | 11/2014 | Bandyopadhyay ..... H04L 67/16 709/204 |

OTHER PUBLICATIONS

Jinwoo et. al, "Device Context Discovery System for Context-aware Services in Ubiquitous Device Collaboration Environment " Apr. 27, 2006.

Akio Sashima, Noriaki Izumi, and Koichi Kurumatani, Consorts: A Multiagent Architecture for Service Coordination in Ubiquitous Computing, Springer-Verlag Berlin Heidelberg 2004.

G.Kousalya and P.Narayanasamy "Heterogeneous device context aware information dissemination." International Journal of Multimedia and Ubiquitous Engineering vol. 6, No. 1, Jan. 2011 Jan. 2011.

Michael Beigl, "Memo Clip: A Location based Remembrance Appliance", Telecooperation Office (TecO), University of Karlsruhe Vincenz-Prieβnitz-Str. 1, D-76131 Karlsruhe, Germany.

Glenn Judd Peter Steenkiste, Providing Contextual Information to Ubiquitous Computing Applications, Jul. 2002,CMU-CS-02-154.

Ioanna Roussaki, Nicolas Liampotis, Nikos Kalatzis, Korbinian Frank and Patrick Hayden, "How to make Personal Smart Spaces Context-aware".

\* cited by examiner

SYSTEM FOR DYNAMIC SERVICE COLLABORATION THROUGH IDENTIFICATION AND CONTEXT OF PLURALITY OF HETEROGENEOUS DEVICES

FIELD OF THE DISCLOSURE

The present disclosure relates to internet and computing field. Particularly, the disclosure relates to a system and method for providing a faster way of collaboration of services based on the context information, in a dynamic manner.

BACKGROUND OF THE DISCLOSURE

Nowadays, with the evolution in the field of ubiquitous computing, a device discovery process, device management and context extraction is becoming more and more critical for an effective collaboration of services.

Though, generation of a unique device identifier during device discovery phase is generally known in the prior art, the prior art fails to teach a means to associate the extracted context of the devices and to achieve a service-context-device association along with recording of updated context of the devices.

Moreover, a device management system generally resides in a central or gateway system, and does not allow the participating devices/sensors to maintain any context database. Even though sensors are equipped to send device information, a problem lies in the loose coupling amongst device discovery, device identification, and its supported services and simultaneous tagging and refreshing of the extracted context of the device. Particularly, in cases where devices are not maintaining any context database by their own or by a device management system, maintaining the said loose coupling along with refreshing of extracted context of the device on regular intervals is still a challenge. Therefore, faster collaboration among the services is not achieved by retrieving the context information from the central device.

SUMMARY OF THE DISCLOSURE

Before the present methods, systems, and hardware enablement are described, it is to be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure which will be limited only by the appended claims.

The present disclosure relates to a ubiquitous computing system, without an additional or external context management device, for context aware collaborative service provisioning of heterogeneous sensor within a smart space. The system comprises a service collaboration platform adapted to receive plurality of sensor information. A plurality of heterogeneous distributed sensors are communicatively coupled with the service collaboration platform, each of the plurality of heterogeneous distributed sensors having a unique device identifier and an associated service identifier, wherein the associated service identifier is associated with a service provided by each of the plurality of heterogeneous distributed sensors, wherein the associated service identifier is configured to act as a key. A sensor management module is adapted to create the unique device identifier by associating a unique medium access control (MAC) address of each of the plurality of heterogeneous sensors with context information of the plurality of heterogeneous sensor respectively, and with the associated service identifier of the service provided by each of the plurality of heterogeneous sensors while performing discovery and registration of a plurality of connected sensors. A device identification table is configured to dynamically update the context information of each of the plurality of heterogeneous sensors corresponding to the MAC address and the associated service identifier of each of the plurality of heterogeneous sensors by the sensor management module. A context extraction module is incorporated within the sensor management module, the context extraction module configured to intermittently run a scan at a predefined time interval to extract the context information of each of the plurality of heterogeneous sensors. At least one service request is transmitted to the service collaboration platform, wherein in response to receiving the at least one service request, the service collaboration platform retrieves at least one sensor service context relation from the device identification table using the associated service identifier as the key corresponding to at least one of the plurality of heterogeneous sensors.

The present disclosure can also be viewed as a ubiquitous computing method, implemented without employing an additional or external context management device, for context aware collaborative service provisioning of heterogeneous sensors within a smart space. In this regard, one embodiment of such a method, among others, can be broadly summarized by the following steps: configuring a unique device identifier for a plurality of heterogeneous distributed sensors communicatively coupled with a service collaboration platform; receiving a plurality of sensor information on the service collaboration platform via a device management module; creating an association between a service identifier of a service provided by each of the plurality of heterogeneous distributed sensors and a unique medium access control (MAC) address of the each of the plurality of heterogeneous distributed sensors and with context information of each of the plurality of heterogeneous distributed sensors, respectively, wherein the service identifier is configured to act as a key; configuring the device management module to correlate each of the plurality of sensor information with the associated MAC address, the associated service identifier, and the context information of each of the plurality of heterogeneous distributed sensors; configuring a device identification table to dynamically update the context information of each of the plurality of heterogeneous distributed sensors corresponding to the associated MAC address and the associated service identifier by the device management module; configuring a context extraction module incorporated within the device management module to intermittently run a scan at a predefined time interval to extract the context information of each of the plurality of heterogeneous distributed sensors; and transmitting at least one service request to the service collaboration platform, wherein in response to receiving the at least one service request, the service collaboration platform retrieves at least one sensor-service-context relation from the device identification table using the associated service identifier as the key corresponding to at least one of the plurality of heterogeneous distributed sensors.

The present disclosure can also be viewed as providing a computer program product having embodied thereon a computer program having program code, implemented without employing an additional or external context management device, for context aware collaborative service provisioning of heterogeneous sensors within a smart space. In this regard, one embodiment of such a computer program product, among others, can be broadly summarized by the following program code portions: program code for configuring a unique device identifier for a plurality of heterogeneous distributed sensors communicatively coupled with a service collaboration platform; program code for receiving a plurality of sensor information on the service collaboration platform via a device management module; program code for creating an association between a service identifier of a service provided by each of the plurality of heterogeneous distributed sensors and a unique medium access control (MAC) address of the each of the plurality of heterogeneous distributed sensors and with context information of each of the plurality of heterogeneous distributed sensors, respectively, wherein the service identifier is configured to act as a key; program code for configuring the device management module to correlate each of the plurality of sensor information with the associated MAC address, the associated service identifier, and the context information of each of the plurality of heterogeneous distributed sensors; program code for configuring a device identification table to dynamically update the context information of each of the plurality of heterogeneous distributed sensors corresponding to the associated MAC address and the associated service identifier by the device management module; program code for configuring a context extraction module incorporated within the device management module to intermittently run a scan at a predefined time interval to extract the context information of each of the plurality of heterogeneous distributed sensors; and program code for transmitting at least one service request to the service collaboration platform, wherein in response to receiving the at least one service request, the service collaboration platform retrieves at least one sensor-service-context relation from the device identification table using the associated service identifier as the key corresponding to at least one of the plurality of heterogeneous distributed sensors.

The current disclosure provides a mechanism to perform faster collaboration among the services by retrieving the context information from the central device/gateway with service id as a key element. The context information and the service identifier (id) of the performed service by the devices/sensors are tagged with the device media access control (MAC) identifier to generate the device identifier. The service id accordingly is used to detect the associated device identifier for extraction of the context from the detected device identifier and further collaboration of services is performed based on the said context.

In another aspect of the disclosure a method and system is provided for context extraction wherein the context is extracted and updated periodically by an active scan method/service. Further a service collaboration platform is disclosed that is adapted to receive plurality of device/sensor information using plurality of heterogeneous distributed sensors communicatively coupled with the service collaboration platform, each sensor has a unique device identifier and associated service identifier.

The primary object of the present disclosure is to provide a ubiquitous/smart computing system adapted for context aware collaborative service provisioning of plurality of heterogeneous devices/sensors.

Another object of the present disclosure is to provide a method and system adapted for a faster way of receiving updates about context of the device/sensor by any service seeking the context of the devices.

Another object of the present disclosure is to provide a method and system adapted for device discovery process, device management, and collaboration of service based on the context retrieved from the devices/sensors.

Another object of the present disclosure is to provide a method and system adapted to create a unique device identifier by associating context information of the device, unique medium access control (MAC) address of the device, and an operation/service identifier, while performing the device registration during device discovery.

Another object of the present disclosure is to provide a method and system for providing a mechanism to perform faster collaboration among the services by retrieving context information from the central device using the service identifier which is a part of device identifier as a key element.

Yet another object of the present disclosure is to provide mechanism of service and device mapping using an/a edge/central system, and also collaboration of services based on the context.

Yet another object of the present disclosure is to provide device registration method for creating a device identifier by tagging the device MAC address with context, and the service identifier of service provided by the device, hence a faster way of extracting the context mapped by the services and device identifier.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION OF THE DISCLOSURE

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described. The disclosed embodiments are merely exemplary of the disclosure, which may be embodied in various forms.

Reference will now be made in detail to the preferred embodiments of the present disclosure, examples of which are illustrated in the accompanying drawings.

Figure 1:
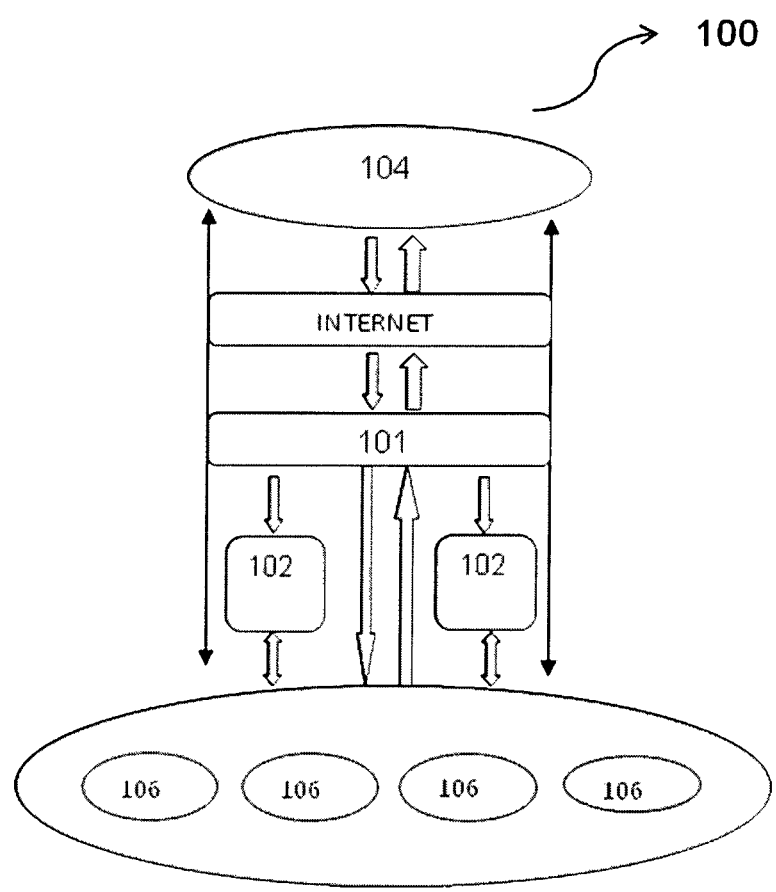
FIG. 1 is a block diagram illustrating a system for collaboration of services based on the context information.

Referring to FIG. 1 is a system for collaboration of services based on the context/service identifier. The ubiquitous computing system 100 for context aware collaborative services comprises of a central control system 101, device management module 102, multiple services 104, and a plurality of heterogeneous sensors/devices 106.

In one embodiment of the disclosure the central system 101 is adapted to receive sensor information including the context from the sensors/devices. The central system 101 comprises a device management module 102. The device management module 102 is adapted to maintain unique device identifier and used to associate the services with the device context. Unique device identifier is created by associating the device MAC address, context information of the device and the associated service identifier of the service/operation performed by the sensor/device. The devices/sensors are co-operative in nature capable of providing different services. According to one exemplary embodiment of the disclosure services use the service identifier part of device identifier as the key to extract the context information. Multiple services can retrieve the context of the associated sensor/device, using the service identifier of the service provided by that device, and collaborate with each other based on the retrieved context of the devices to generate the final output.

For each discovered device a unique device identifier is created by the device management module and for subsequent registration thereof an association map of plurality of device specific aspects is generated, the association map comprising a unique media access control (MAC) address of the device, extracted context information of the device, and an operation/service identifier of the device.

In another embodiment of the disclosure the central control system 101 configured with a context extraction module which is a part of or incorporated within the device management module to intermittently run a scan to fetch the sensor information including context at a predefined time interval for updating the context information of sensor into the device identifier table.

According to one exemplary embodiment of the disclosure the context information is getting refreshed/updated based on a specific time interval set by the user. The service collaboration is dynamic in nature, based on the latest contextual information. The device/sensor does not maintain any context information database within it.

In another embodiment of the disclosure multiple services 104 are adapted to function as part of a cloud computing system or as any other distributed environment architecture. The service 104 resides in cloud interacts with the control system 101. The services 104 perform collaboration based on the context information received from the various diverse sensor devices 106 by accessing the device identifier from the (service-context-device ID) device identifier table, using service id as key.

In another embodiment of the disclosure the plurality of heterogeneous sensor/device 106 directs sensing information to the central control system 101. According to one exemplary embodiment of disclosure a plurality of heterogeneous distributed sensors 106 is communicatively coupled with the service collaboration platform, wherein each sensor 106 has a unique device identifier and associated service identifier. The heterogeneous distributed sensor 106 may refer to sensors which are configured to sense different things. For example heterogeneous distributed sensors may refer to a temperature sensor, a humidity sensor and speed sensor that work together in an environment.

The system 100 further comprises a device/sensor management module configured to receive sensor information from the sensor devices 106 and correlate each sensor-information with sensor/device MAC identification and its context, service it provides, and associated time value. The said sensor management module includes a device identifier (service-context-deviceid) table configured to dynamically record each update of each sensor's context data corresponding to its MAC identifier and service identifier.

The system 100 further comprises at least one service request to the service collaboration platform is configured to retrieve at least one set of context information of the sensor from the table maintained by the device management module 102 using service id as key.

In another embodiment of the disclosure the device identifier creation as proposed by the current disclosure creates unique device identifier by associating the device Media Access Control (MAC) address, context information of the device/sensor 106 and the associated service identifier of the service/operation performed by the device/sensor 106. The devices 106 are capable of performing different services.

The system 100 may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the system to interact with a user directly or through the client devices. Further, the I/O interface may enable the system to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, non-transitory memories, flash memories, hard disks, optical disks, and magnetic tapes. The memory may include modules and data.

The modules include routines, programs, objects, components, data structures, etc., which perform particular tasks or implement particular abstract data types. In one implementation, the modules may include sensor and/or device management module and a context extraction module, among others. Other modules may include programs or coded instructions that supplement applications and functions of the system.

Example 1

Figure 2:
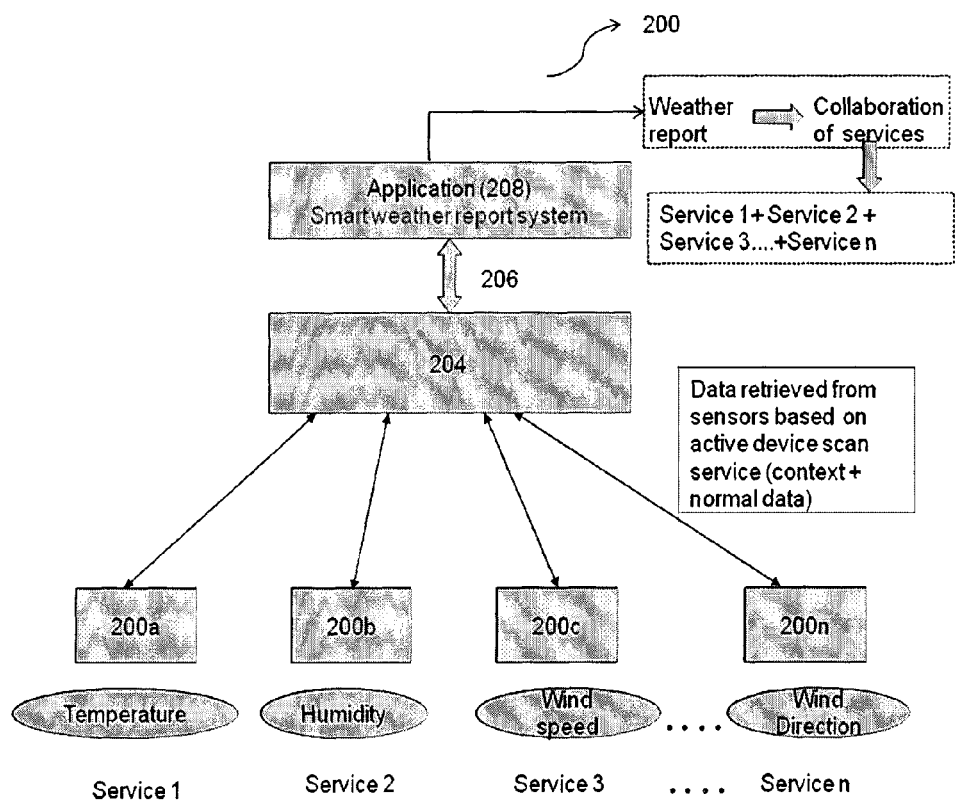
FIG. 2 is an exemplary example explaining ubiquitous computing system for context aware collaborative service.

FIG. 2 is an exemplary example explaining ubiquitous computing system for a context aware collaborative service.

FIG. 2 illustrates smart weather system 200 or smart space. The system 200 comprises plurality of sensors (200a, 200b, 200c, and 200n) adapted for generating sensor information. The sensors enable the system 200 to generate sensor information relating temperature, wind speed, humidity and wind direction, chances of rain, etc.

The system 200 further comprises a central system 204 adapted to receive information from the sensor devices (200*a*, 200*b*, 200*c*, and 200*n*) and direct information to the service collaboration application 208 to the final application which generates the weather report after collaborating the results/outputs like temperature, wind speed, geographical location etc. from the various responsible services. The system 200 further comprises a device/sensor management module which performs active device scan and is adapted to retrieve data from sensors (200*a*, 200*b*, 200*c*, and 200*n*) and also updating and refreshing context information.

The system 200 creates a service and device mapping using the central system 204, and also adapted for collaboration of services based on the context. The disclosure does not use any architecture using context management system separately.

The system 200 employs a device registration method. The system creates a device identifier by tagging its MAC address with context as well as service identifier of the service provided by the device, and further adapted for getting faster way of extracting the context from the device identifier. The system 200 enables a faster way of collaboration of services based on the context dynamically.

The system 200 creates the device identifier by the central system 204 with associating context information, unique medium control access address of the device, and an operation/service identifier, while performing the device registration. The system 200 is configured with a context extraction module as a part of device management module to intermittently run a scan at a predefined time interval for updating the context information of sensors/devices into the device identifier table.

It will be apparent to those skilled in the art that various modifications and variations can be made in the present disclosure. Thus, it is intended that the present disclosure covers the modifications and variations of this disclosure provided they come within the scope of the appended claims and their equivalents.

We claim:

1. A ubiquitous computing system, without an additional or external context management device, for context aware collaborative service provisioning of heterogeneous sensor within a smart space, the system comprising:
    a processor; and
    a memory coupled to the processor, wherein the memory comprises a plurality of modules configured for executing a processor executable instructions, comprising:
    a service collaboration platform adapted to receive plurality of sensor information from a plurality of heterogeneous distributed sensors communicatively coupled with the service collaboration platform, each of the plurality of heterogeneous distributed sensors having a unique device identifier and an associated service identifier, wherein the associated service identifier is associated with a service provided by each of the plurality of heterogeneous distributed sensors, wherein the associated service identifier is configured to act as a key;
    a sensor management module adapted to create the unique device identifier by associating a unique medium access control (MAC) address of each of the plurality of heterogeneous sensors with context information of the plurality of heterogeneous sensor respectively, and with the associated service identifier of the service provided by each of the plurality of heterogeneous sensors while performing discovery and registration of a plurality of connected sensors, and for a subsequent registration thereof, an association map of a plurality of device-specific aspects is generated;
    a device identification table configured to dynamically update the context information of each of the plurality of heterogeneous sensors corresponding to the MAC address and the associated service identifier of each of the plurality of heterogeneous sensors by the sensor management module;
    a context extraction module incorporated within the sensor management module, the context extraction module configured to intermittently run a scan at a predefined time interval to extract the context information during a sensor discovery phase and parse the extracted context information of each of the plurality of heterogeneous sensors, wherein the extracted context information is used by the sensor management module to create the unique device identifier and update the device identification table; and
    at least one service request transmitted to the service collaboration platform, wherein in response to receiving the at least one service request, the service collaboration platform retrieves at least one sensor service context relation from the device identification table using the associated service identifier as the key corresponding to at least one of the plurality of heterogeneous sensors.

2. The system as claimed in claim 1, further comprising a central control system for maintaining the sensor management module.

3. The system as claimed in claim 1, wherein an instance of the context information of the plurality of heterogeneous sensors and corresponding associated service identifiers thereof are tagged with the unique device identifier.

4. The system as claimed in claim 1, wherein the predefined time interval is a user-specified time interval.

5. A ubiquitous computing method, implemented without employing an additional or external context management device, for context aware collaborative service provisioning of heterogeneous sensors within a smart space, the method comprising the steps of:
    configuring a unique device identifier for a plurality of heterogeneous distributed sensors communicatively coupled with a service collaboration platform;
    receiving a plurality of sensor information on the service collaboration platform via a device management module;
    creating the unique device identifier by associating a service identifier of a service provided by each of the plurality of heterogeneous distributed sensors and a unique medium access control (MAC) address of the each of the plurality of heterogeneous distributed sensors and with context information of each of the plurality of heterogeneous distributed sensors, respectively, while performing discovery and registration of a plurality of connected sensors, and for a subsequent registration thereof, an association map of a plurality of device-specific aspects is generated, wherein the service identifier is configured to act as a key;
    configuring the device management module to correlate each of the plurality of sensor information with the associated MAC address, the associated service identifier, and the context information of each of the plurality of heterogeneous distributed sensors;
    configuring a device identification table to dynamically update the context information of each of the plurality of heterogeneous distributed sensors corresponding to the associated MAC address and the associated service identifier by the device management module;

configuring a context extraction module incorporated within the device management module to intermittently run a scan at a predefined time interval to extract the context information during a sensor discovery phase and parse the extracted context information of each of the plurality of heterogeneous distributed sensors, wherein the extracted context information is used by the sensor management module to create the unique device identifier and update the device identification table; and transmitting at least one service request to the service collaboration platform, wherein in response to receiving the at least one service request, the service collaboration platform retrieves at least one sensor-service-context relation from the device identification table using the associated service identifier as the key corresponding to at least one of the plurality of heterogeneous distributed sensors.

6. The method as claimed in claim 5, further comprising the step of updating the context information by performing a periodic scan of the plurality of heterogeneous distributed sensors by the device management module at a user specified time interval.

7. The method as claimed in claim 5, further comprising the step of configuring the device management module to correlate each of the plurality of sensor information with the associated MAC address, the associated service identifier, and the context information of each of the plurality of heterogeneous distributed sensors and with an operation/service identifier of the service provided by each of the plurality of heterogeneous distributed sensors while performing discovery and registration of a plurality of connected sensors.

8. The method as claimed in claim 7, wherein for each of the plurality of heterogeneous distributed sensors discovered during discovery, the unique device identifier is created by the device management module, and an association map of a plurality of device specific aspects is generated, wherein the unique device identifier comprises the unique media access control (MAC) address of each of the plurality of heterogeneous distributed sensors, the context information of each of the plurality of heterogeneous distributed sensors, and the operation/service identifier of the service performed by each of the plurality of heterogeneous distributed sensors.

9. The method as claimed in claim 5, wherein an instance of the context information of each of the plurality of heterogeneous distributed sensors is tagged with the corresponding MAC address and the service identifier of the service provided by each of the plurality of heterogeneous distributed sensors.

10. The method as claimed in claim 5, wherein extraction of the context information of each of the plurality of heterogeneous distributed sensors is initiated from a device discovery phase and performed periodically by the context extraction module.

11. The method as claimed in claim 5, further comprising the step of receiving the plurality of sensor information from a central control system.

12. A computer program product having embodied thereon a computer program having program code stored in a non-transitory medium, implemented without employing an additional or external context management device, for context aware collaborative service provisioning of heterogeneous sensors within a smart space, the computer program product comprising:

program code for configuring a unique device identifier for a plurality of heterogeneous distributed sensors communicatively coupled with a service collaboration platform;

program code for receiving a plurality of sensor information on the service collaboration platform via a device management module;

program code for creating the unique device identifier by associating a service identifier of a service provided by each of the plurality of heterogeneous distributed sensors and a unique medium access control (MAC) address of the each of the plurality of heterogeneous distributed sensors and with context information of each of the plurality of heterogeneous distributed sensors, respectively, while performing discovery and registration of a plurality of connected sensors, and for a subsequent registration thereof, an association map of a plurality of device-specific aspects is generated, wherein the service identifier is configured to act as a key;

program code for configuring the device management module to correlate each of the plurality of sensor information with the associated MAC address, the associated service identifier, and the context information of each of the plurality of heterogeneous distributed sensors;

program code for configuring a device identification table to dynamically update the context information of each of the plurality of heterogeneous distributed sensors corresponding to the associated MAC address and the associated service identifier by the device management module;

program code for configuring a context extraction module incorporated within the device management module to intermittently run a scan at a predefined time interval to extract the context information during a sensor discovery phase and parse the extracted context information of each of the plurality of heterogeneous distributed sensors, wherein the extracted context information is used by the sensor management module to create the unique device identifier and the update device identification table; and program code for transmitting at least one service request to the service collaboration platform, wherein in response to receiving the at least one service request, the service collaboration platform retrieves at least one sensor-service-context relation from the device identification table using the associated service identifier as the key corresponding to at least one of the plurality of heterogeneous distributed sensors.

13. The computer program product of claim 12, further comprising program code for updating the context information by performing a periodic scan of the plurality of heterogeneous distributed sensors by the device management module at a user specified time interval.

14. The computer program product of claim 12, further comprising program code for configuring the device management module to correlate each of the plurality of sensor information with the associated MAC address, the associated service identifier, and the context information of each of the plurality of heterogeneous distributed sensors and with an operation/service identifier of the service provided by each of the plurality of heterogeneous distributed sensors while performing discovery and registration of a plurality of connected sensors.

15. The computer program product of claim 14, wherein for each of the plurality of heterogeneous distributed sensors discovered during discovery, the unique device identifier is created by the device management module, and an association map of a plurality of device specific aspects is generated, wherein the unique device identifier comprises the unique media access control (MAC) address of each of the plurality of heterogeneous distributed sensors, the context information of each of the plurality of heterogeneous distributed sensors, and the operation/service identifier of the service performed by each of the plurality of heterogeneous distributed sensors.

16. The computer program product of claim 12, wherein an instance of the context information of each of the plurality of heterogeneous distributed sensors is tagged with the corresponding MAC address and the operation/service identifier of the service provided by each of the plurality of heterogeneous distributed sensors.

17. The computer program product of claim 12, wherein extraction of the context information of each of the plurality of heterogeneous distributed sensors is initiated from a device discovery phase and performed periodically by the context extraction module.

18. The computer program product of claim 12, further comprising program code for receiving the plurality of sensor information from a central control system.

* * * * *